United States Patent [19]

Buesing

[11] 4,247,396
[45] Jan. 27, 1981

[54] CHEMICAL SOLUTION DISPENSER

[75] Inventor: Jonathan P. Buesing, St. Paul, Minn.

[73] Assignee: Ecodyne Corporation, Lincolnshire, Ill.

[21] Appl. No.: 101,356

[22] Filed: Dec. 7, 1979

[51] Int. Cl.³ ............................................ B01D 23/24
[52] U.S. Cl. .................................... 210/126; 210/191; 222/67; 222/286
[58] Field of Search ................... 137/101.11, 101.27, 137/101.31; 210/126, 128, 190, 191, 278; 222/67, 285, 286, 335

[56] References Cited

U.S. PATENT DOCUMENTS

| | | | |
|---|---|---|---|
| 3,190,726 | 6/1965 | Rudelick | 422/264 |
| 3,208,471 | 9/1965 | Olsen | 210/126 |
| 3,227,524 | 1/1966 | White | 422/264 |
| 3,434,490 | 3/1969 | Lyall | 417/401 |
| 3,590,846 | 7/1971 | Eisele et al. | 137/268 |
| 3,762,550 | 10/1973 | Jarr et al. | 210/126 |

FOREIGN PATENT DOCUMENTS 550589  1/1943  United Kingdom ............. 210/191

*Primary Examiner*—Ivars C. Cintins
*Attorney, Agent, or Firm*—Joel E. Siegel; Charles M. Kaplan

[57] ABSTRACT

A dispenser for an aqueous solution of a chemical, such as potassium permanganate, that should be confined at all times encloses the chemical in a lightweight disposable jar. The dispenser is actuated by a valve that has a relatively large float on one end of a stem and a diaphragm at the other end of such stem. It is not necessary for the user of the chemical to ever remove it from the container in which it is sold.

10 Claims, 4 Drawing Figures

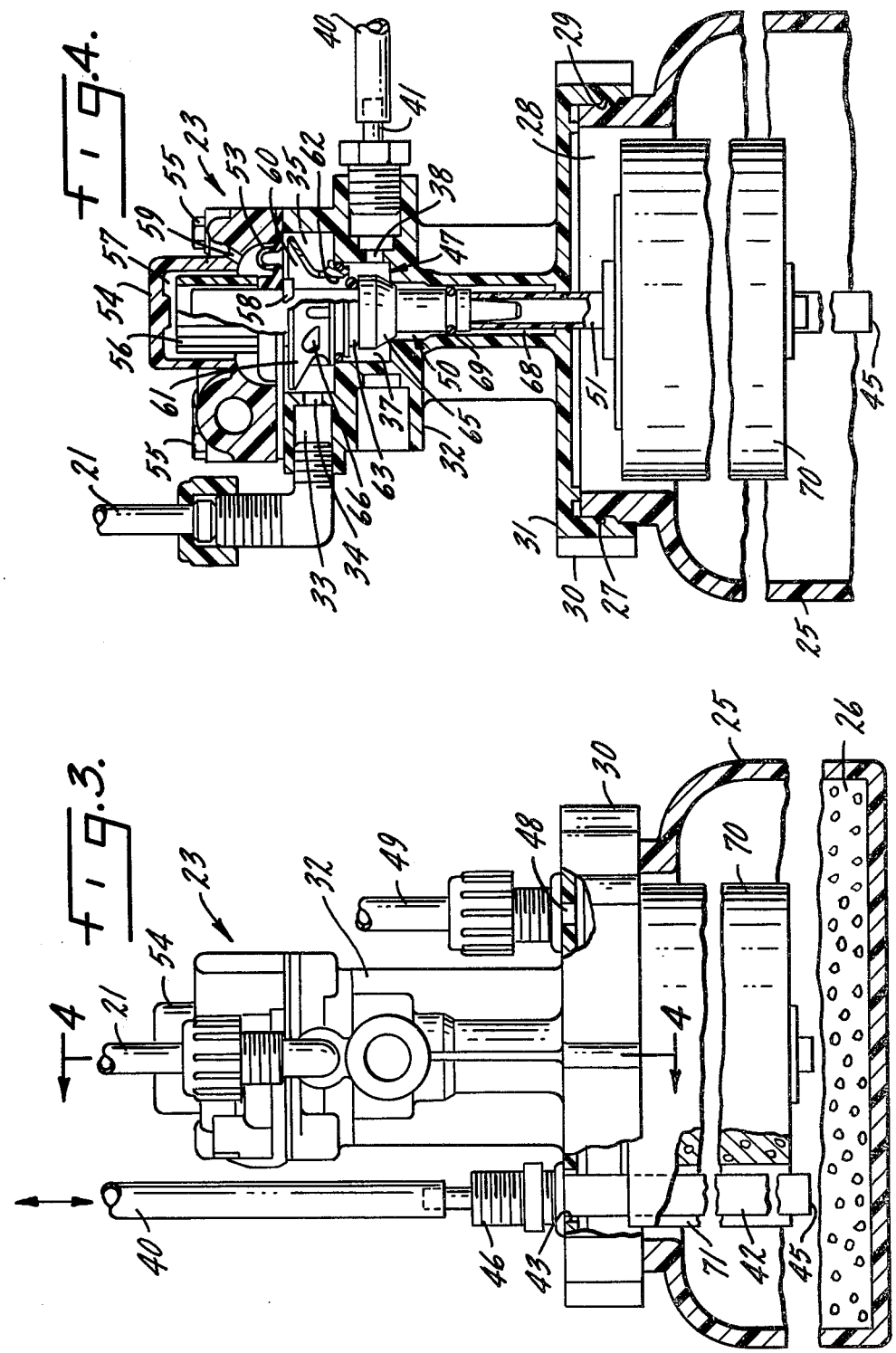

CHEMICAL SOLUTION DISPENSER

BACKGROUND OF THE INVENTION

This invention relates to dispensers for metering a chemical solution, and more particularly to the packaging, dissolving and dispensing of a controlled dose of regenerant chemical for a filter that removes iron from water.

It is sometimes necessary for homeowners to use chemicals which are expensive, odorous or staining. For example, people who use manganese zeolite or greensand filters to remove iron from their home water supply must periodically regenerate the filter material with an acqueous solution of potassium permanganate. Neither the regenerant solution nor the dry chemical from which it is made should be permitted to leak or escape from the system in which it is used. Yet prior iron removal systems required the user to measure, dispense or in other ways handle the regenerant chemical. This inevitably resulted in spilling of the chemical or in an improper chemical dosage being used to regenerate the iron filter.

OBJECTIVES OF THE INVENTION

Accordingly, it is an object of this invention to provide an improved chemical solution dispenser.

Another object is to improve the way an iron removing filter is regenerated.

Another object is to provide a chemical solution dispenser that has a constant liquid level when filled but dispenses an adjustable dose.

Another object is to provide a chemical solution dispenser with a float valve that is guided by a dosage measuring tube.

Another object is to market, store and dispense an expensive and staining regenerant chemical in a disposable container from which it need never be removed by the user.

Another object is to provide a chemical solution dispenser for a pressurized system that utilizes a relatively lightweight chemical container that is subjected to only atmospheric pressure.

Another object is to provide an automatic, adjustable, accurate, lightweight, easily maintained, low cost system for dispensing regenerant chemical solution to a filter for removing iron from water that does not possess defects found in prior art regenerant dispensing systems.

Other objects and advantages of the invention will be found in the specification and claims, and the scope of the invention will be pointed out in the claims.

DESCRIPTION OF THE DRAWING

FIG. 3 is a partially cross sectional side view of the dispenser in FIG. 2.

FIG. 4 is a cross sectional view taken along the line 4—4 in FIG. 3.

DESCRIPTION OF THE INVENTION

Figure 1:
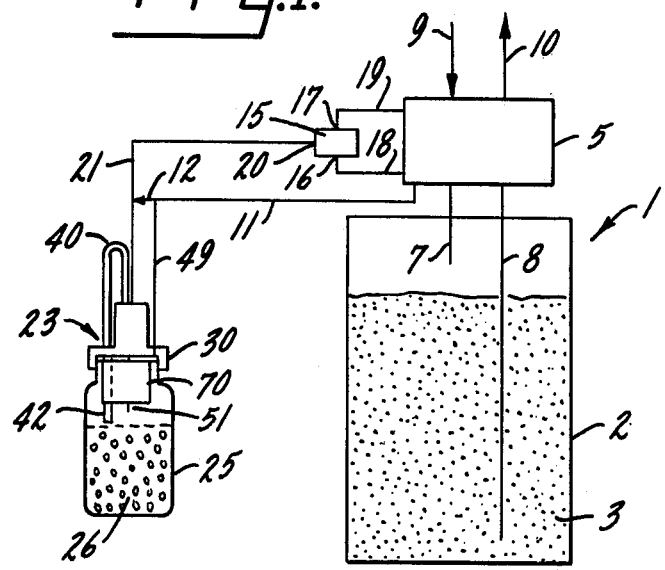
FIG. 1 is a schematic, partially cross sectional side view of an iron filter in accord with this invention.

A filter 1 for removing iron from water has a tank 2 containing a bed 3 of iron removing particles such as manganese greensand or manganese zeolite. A conventional electrically operated master control valve 5 is connected to the inside of tank 2 through an inlet conduit 7 and an outlet conduit 8. Valve 5 connects tank 2 to a conduct 9 from a source of pressurized untreated water, to a treated water conduit 10, and to a drain line 11 connected to a drain conduit 12 at atmospheric pressure. A conventional aspirator 15 has a pair of ports 16 and 17 connected to master control valve 5 by lines 18 and 19. A suction port 20 on aspirator 15 is connected by a line 21 to a regenerant solution dispenser valve 23 in accord with this invention. When water from control valve 5 flows from port 16 to port 17, aspirator 15 produces a suction at port 20, and when water from control valve 5 flows from port 17 toward port 16, aspirator 15 produces a pressurized flow of water out through port 20. A container 25 encloses sufficient dry regenerant chemical 26 (e.g. potassium or sodium permanganate) to produce enough regenerant solution to regenerate bed 3 many times.

The iron removal system shown in FIG. 1 operates in the following general manner. During the service cycle untreated pressurized water containing iron enters master control valve 5 through conduit 9 and flows through conduit 7 into the top of tank 2. Iron is removed from the water as it flows downwardly through bed 3 and the treated water leaves tank 2 through conduit 8 and flows to conduit 10 through valve 5. At some time that is determined automatically by control valve 5, the regeneration cycle begins. Water from conduit 9 flows through valve 5 and lines 18 into port 16 of aspirator 15. This creates suction at port 20 which draws the regenerant solution from container 25 through valve 23 and line 21. The regenerant solution passes through aspirator 15 and line 19 into control valve 5, where it is mixed with water from conduit 9 and flowed through conduit 8 to the bottom of tank 2. The regeneration solution passes upwardly through bed 3 and restores the iron removing properties of the particles in the bed. The spent regenerant flows out of tank 2 through conduit 7 and valve 5 into drain line 11 and drain conduit 12. Water continues to flow upwardly from conduit 8 to backwash bed 3 after a predetermined dose of regenerant solution has been metered by valve 23 as described hereafter, and at the same time the flow through aspirator 15 is reversed by valve 5, and water flows through line 19 into port 17. This water flows through line 21 into valve 23 and fills container 25 in a manner described hereafter. The water in container 25 dissolves sufficient chemical to provide the required solution for the next regeneration cycle. Finally, flow through bed 3 is reversed and water flows rapidly downwardly from conduit 7 through the bed into conduit 8 and out through valve 5 and drain line 11; this fast rinses bed 3. The system then returns to service as described above.

Figure 2:
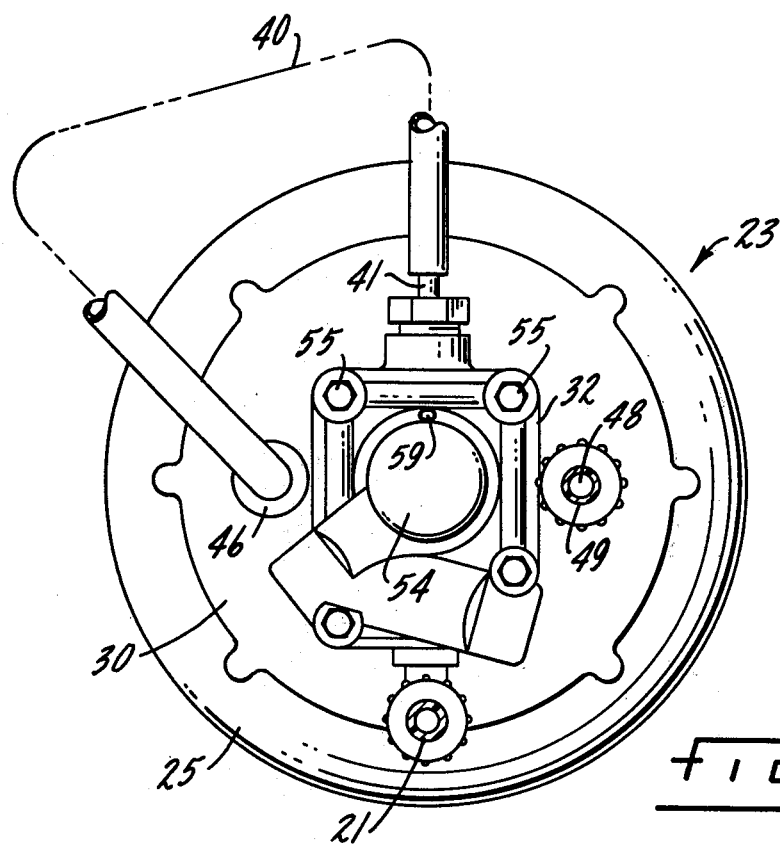
FIG. 2 is an enlarged top plan view of the regenerant solution dispenser for the filter in FIG. 1.

Referring to FIGS. 2-4, container 25 is a light-weight disposable plastic jar in which the dry chemical 26 is originally packaged and marketed. Jar 25 has standard screw threads 27 (e.g. SPI 110-400) encircling its open top 28. Threads 27 are screwed into mating grooves 29 in an integral cap 30 defined by an enlarged flange 31 in the lower end of the body 32 of valve 23. Body 32 has a port 33 that communicates with suction port 20 through line 21. A hole 34 connects port 33 to a circular diaphragm chamber 35, and chamber 35 merges into a circular closure chamber 37. A hole 38 connects chamber 37 to a hollow flexible hose 40 that has one end which fits over a nipple 41. The other end of hose 40 is connected to a rigid hollow cylindrical dosage tube 42 which passes through a aperture 43 in cap 30 and into jar 25. Tube 42 is slideable in aperture 43 so that the vertical location of its terminal end 45 can be positioned to regulate the amount of chemical solution withdrawn from jar 25. An adaptor 46 threaded on to the upper end of tube 42 holds end 45 at the elevation required to dispense the necessary dose of regenerant solution. Holes 34 and 38, chambers 35 and 37, hose 40, and tube 42 define a passage 47 through body 32 that connects port 33 to the interior of container 25 and provides a flow path for liquid into and out of the container. A vent passage 48 in cap 30 communicates with drain conduit 12 through a line 49 and provides an air escape and overflow path from the container, which remains at atmospheric pressure at all times.

Valve means 50 for opening and closing passage 47 includes stem means 51. A flexible diaphragm 53 is held in place by a removable end cap 54 that compresses the peripheral edge of the diaphragm against an end of valve body 32. Cap 54 is attached by screws 55 that thread into holes in body 32. A bearing 56 on the upper end of stem means 51 fits loosely in and is slideable in a cavity 57 in cap 54. Stem means 51 passes through a hole in the center of diaphragm 53 and a shoulder 58 on the stem holds the diaphragm against bearing 56. One face of diaphragm 53 defines a surface of chamber 35 and is thus subjected to the same pressure as chamber 35. The other face of diaphragm 53 is vented to the atmosphere through a hole 59 in end cap 54. Thus when the pressure in chamber 35 is less than atmospheric pressure, diaphragm 53 is drawn downwardly. Any movement of the diaphragm causes attached shaft means 51 to move the same amount.

Shaft means 51 passes through a large hole 60 in the center of a circular hollow valve seat member 61. An annular sealing surface 62 at one end of seat member 61 extends into chamber 37 and mates with an O-ring 63 at one end of an enlarged annular projection or valve seat means 65 on the central portion of shaft means 51. Projection 65 is circular in cross section. Holes 66 in the surface of member 61 permit liquid to flow from chamber 35 through member 61 and into chamber 37 and from chamber 37 into chamber 35. Shaft means 51 extends through a hole 68 that passes through body 32 and connects chamber 37 to the inside of cap 30. An O-ring 69 seals the space in hole 68 between shaft means 51 and body 32 to prevent air from bottle 25 from being drawn into body 32 when suction is applied to port 33. The lower end of shaft means 51 extends into container 25 and has cylindrical float 70 affixed thereto. Float 70 is relatively large in that its diameter is only slightly less than the diameter of the open end of jar 25, and float 70 is at least about one third as tall as jar 25. Upward movement of float 70 causes shaft means 51 and projection 65 to move upwardly until O-ring 63 seats against surface 62, thus closing passage 47. A circular vertical hole 71 passes through float 70 at its outer edge. Tube 42 extends through hole 71 beyond float 70. Hole 71 is slightly larger in diameter than tube 42 so that the tube and float are freely vertically movable relative to each other.

When the regeneration cycle for fliter 1 begins, water from conduit 9 flows through line 21 into port 33, and through hole 34 into chamber 35. The water in chamber 35 then passes through holes 66 in seat member 61, past projection 65 and O-ring 63, which is not seated against sealing surface 62, and into chamber 37. From chamber 37 the water passes through hole 38 and into hose 40, and from hose 40 into container 25. As the water fills container 25 it reaches float 70 and causes the float to rise. The upward movement of float 70 carries attached stem means 51 upwardly until O-ring 63 seals against surface 62. This closes passage 47 and prevents further flow of water into container 25. The water in container 25 dissolves sufficient solid chemical to provide the regenerant solution, and then the flow through aspirator 15 is reversed by valve 5. This creates a negative pressure at port 20, which is transmitted through line 21 to port 33 and chamber 35 in valve 23. This negative pressure sucks some of the water from chamber 35 and pulls diaphragm 53 downwardly. Shaft means 51 is attached to diaphragm 53 and it also moves downwardly against the upward bias of float 70 at the other end of the shaft. The downward movement of shaft means 51 moves O-ring 63 out of contact with surface 62, and thus connects all of passage 47 to the suction at port 20. This causes the regenerant solution in container 25 to enter end 45 of tube 42 and to flow through passage 47 into line 21, and then into filter 1 as described above.

The quantity of chemical solution metered out by valve 23 is determined by the vertical location of the end 45 of tube 42 in container 25. When the liquid level falls to that of tube end 45, air from drain conduit 12 and line 49 enters tube 42 and is drawn through passage 47 and line 21 into port 20 where it mixes with the water flowing through bed 3. This air agitates the bed and contributes to the effectiveness of the regeneration and backwash cycles. To change the amount of regenerant solution metered by valve 23, tube 42 is slid into or out of container 25 until end 45 is at the required vertical location. Tube 42 passes freely through float 70 and acts as a guide for float 70 as the float rises and falls with the liquid level in container 25. Valve 23 should be provided with O-rings or other gaskets and conventional fittings where needed.

It has thus been shown that by the practice of this invention a dry chemical may be packaged, marketed, and dispensed in accurately measured doses as a solution from a lightweight, inexpensive disposable jar without having to be handled in any way by the user. The chemical does not leave the jar except when used to regenerate an iron filter. This is accomplished because using diaphragm 53 and relatively large float 70 at opposite ends of shaft means 51 enables dispenser 23 to operate automatically. By passing dosage tube 42 through hole 71 in float 70, the size of the float is maximized, and tube 42 acts as a guide preventing movements of float 70 that could cause the dispenser to malfunction.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A chemical solution dispenser comprising:
   A. an open-ended container enclosing a supply of solid chemical;
   B. a valve body, the open end of said container being removably attachable to said body, said body having a port communicating with a source of pressurized liquid and a source of suction, means defining a passage in said body connecting said port to the interior of said container and providing a flow path for liquid into and out of said container;

C. valve means comprising:
1. stem means having one of its ends passing through said passage and its other end extending into said container;
2. a diaphragm attached to said means adjacent said one end, one surface of said diaphragm being exposed to said passage;
3. a float attached to the other end of said stem means, said float being in contact with liquid in said container above said solid chemical;
4. valve closure means on said stem means in said passage between said diaphragm and float;
5. valve seat means surrounding said passage;
6. means sealingly attaching said valve body to the open end of said container; and
7. said float moving said valve closure means into contact with said valve seat means to close said passage when the liquid in said container reaches a predetermined level, and said diaphragm moving said valve closure means against the bias caused by said float out of contact with said valve seat means when suction is applied to said port, whereby a solution of said chemical is withdrawn from said dispenser by such suction.

2. The invention defined in claim 1, wherein said means for sealingly attaching said container to said valve body includes an enlarged flange on one end of said valve body defining a cap for said container.

3. The invention defined in claim 2, wherein a tube defines a part of said passage and passes into said container through an aperture in said cap, said tube being slidable through said aperture so that the position of its end in said container determines the quantity of chemical solution withdrawn from said dispenser.

4. The invention defined in claim 3, wherein said float has a hole therethrough, said tube passes through said hole, and said tube and float are movable independently of each other.

5. The invention defined in claim 2, wherein said enlarged flange has threads which mate with threads on the open end of said container.

6. A filter for removing iron from water comprising:
A. a tank containing a bed of iron removing particles and having an inlet and an outlet;
B. an aspirator having a pair of ports and a suction inlet, said aspirator producing suction at said suction inlet when water flows between said pair of ports in one direction and producing a pressurized flow of water from said suction inlet when water flows in the opposite direction between said ports;
C. a master control valve connecting said tank inlet to a source of pressurized untreated water, said control valve connecting said tank outlet to a treated water conduit, said control valve being connected to a drain conduit and to said aspirator ports; and
D. means for regenerating said iron removing particles comprising:
1. an open-topped container enclosing a supply of solid regenerant chemical, said container having threads around its open top;
2. a regenerant solution dispenser valve body, the open end of said container being screwed into mating threads in a cap defined by the lower end of said valve body, said valve body having a port communicating with said suction inlet, means defining a passage in said body connecting said port to the open end of said container and providing a flow path for liquid into and out of said container, and a vent passage in said body connecting the open end of said container to a drain and providing an air escape and over flow path from said container;
3. valve means comprising:
   a. stem means having one of its ends passing through said passage and its other end extending into said container;
   b. a diaphragm attached to said stem means adjacent said one end, one surface of said diaphragm being exposed to said passage and the opposite surface of said diaphragm being exposed to the atmosphere;
   c. a tube defining a part of said passage and passing into said container through an aperture in said cap, said tube being slidable through said aperture so that the position of its end in said container determines the quantity of regenerant solution withdrawn from said dispenser;
   d. a float attached to the other end of said stem means, said float being in contact with regenerant solution in said container above said solid chemical, said float having a hole therethrough, said stem passing through said hole, said tube and float being vertically moveable independently of each other;
   e. an enlarged annular projection on said stem means in said passage between said diaphragm and float;
   f. valve seat means surrounding said passage;
   g. said float moving said annular projection into contract with said valve seat means to close said passage when the regenerant solution in said container reaches a predetermined level, and said diaphragm moving said annular projection against the bias caused by said float out of contact with said valve seat means when suction is applied to said port, whereby regenerant solution is withdrawn from said dispenser by such suction.

7. A chemical solution dispenser comprising:
A. an open-ended container enclosing a supply of chemical;
B. a valve body, the open end of said container being removably attached to said body, said body having a port communicating with a source of liquid, means defining a passage in said body connecting said port to the open end of said container and providing a flow path for liquid into and out of said container;
C. valve means comprising stem means with means for opening and closing said passage, and a float in said container attached to an end of said stem means;
D. a movable hollow tube defining a portion of said passage passing through said body into said container, the position of the end of said tube in said container determining the quantity of solution dispensed from said container; and
E. said float having a hole therethrough, said tube passing through said hole, and said float and tube being vertically moveable independently of each other.

8. The invention defined in claim 7, wherein a diaphragm is attached to said stem means adjacent the end opposite said float.

9. The invention defined in claim 7, wherein said passage is defined in part by a flexible hose outside of said valve body connected to the upper end of said tube.

10. The invention defined in claim 7, wherein said float essentially fills the open end of said container.

* * * * *